Figure 1:
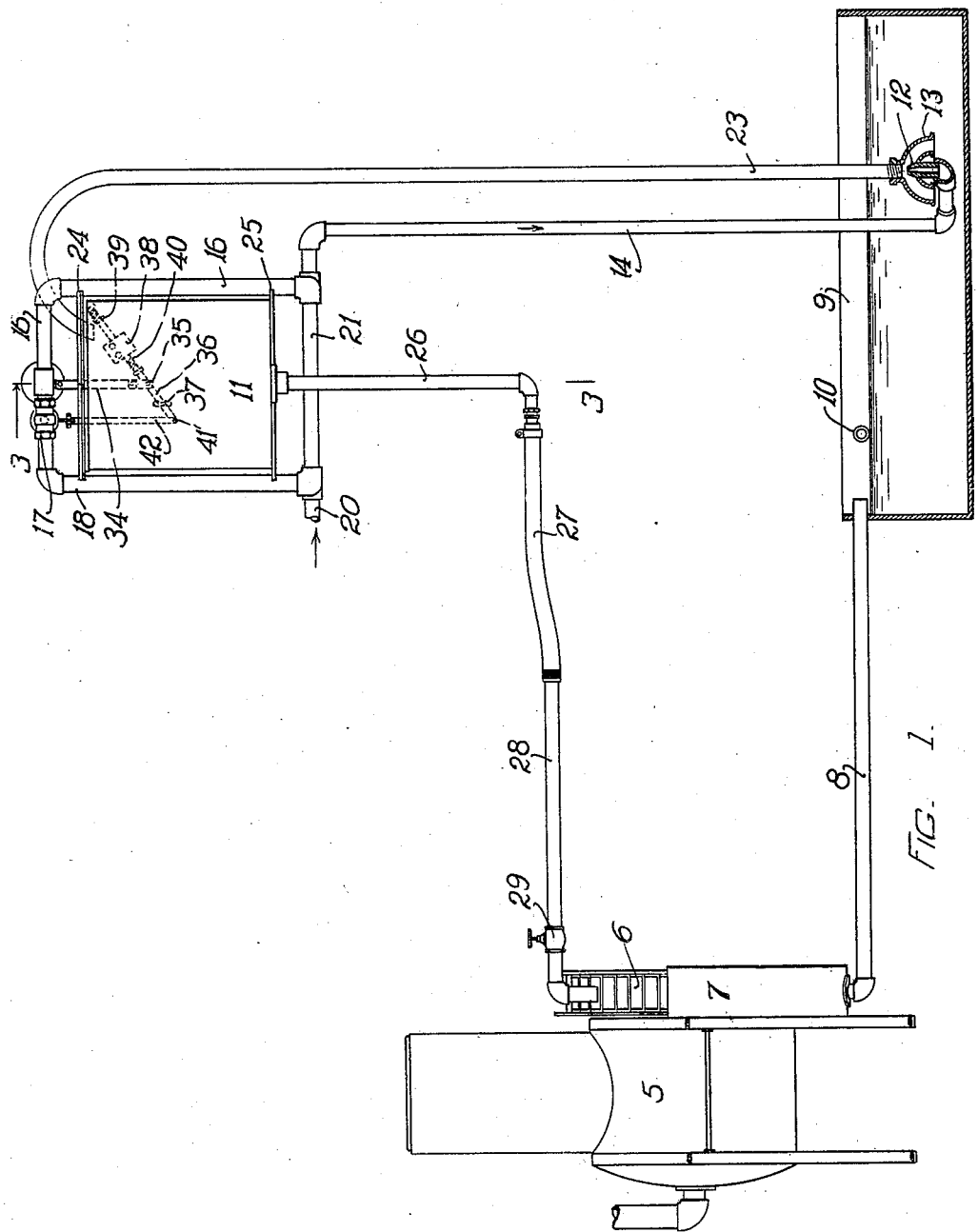

No. 860,688. PATENTED JULY 23, 1907.
G. W. PALMER & F. E. PIERCE.
WATER LIFTING APPARATUS.
APPLICATION FILED AUG. 22, 1906.

2 SHEETS—SHEET 1.

WITNESSES

INVENTORS
George W. Palmer
Frederick E. Pierce
BY
ATT'Y.

No. 860,688. PATENTED JULY 23, 1907.
G. W. PALMER & F. E. PIERCE.
WATER LIFTING APPARATUS.
APPLICATION FILED AUG. 22, 1906.

2 SHEETS—SHEET 2.

WITNESSES
INVENTORS.
George W. Palmer
Frederick E. Pierce
BY
ATT'Y.

UNITED STATES PATENT OFFICE.

GEORGE W. PALMER AND FREDERICK E. PIERCE, OF LANCASTER, MASSACHUSETTS.

WATER-LIFTING APPARATUS.

No. 860,688.　　　Specification of Letters Patent.　　　Patented July 23, 1907.

Application filed August 22, 1906. Serial No. 331,614.

*To all whom it may concern:*

Be it known that we, GEORGE W. PALMER and FREDERICK E. PIERCE, both of Lancaster, in the county of Worcester and State of Massachusetts, have invented new and useful Improvements in Water-Lifting Apparatus; and we do hereby declare that the following is a full, clear, and exact description of the same.

The object of this invention is to utilize, for various purposes, the energy of a jet of water escaping from pressure, and especially to employ the force of such a jet to repeatedly elevate an additional quantity of water, the weight of which may be repeatedly used to turn a wheel or otherwise act mechanically.

By our improvement only a small percentage of the water so used passes each time it is used through the meter commonly employed to measure the quantity consumed.

We thus effect a material reduction in water bills by converting the force of the escaping jet into the steady mechanical power derived from the weight of a body of water repeatedly used. Ordinarily such force is entirely wasted.

In carrying out our invention we employ a tank containing a considerable quantity of water in which is submerged a pipe leading from a water main and conducting a current of water under pressure. We form an outlet from this pipe below the water level, permitting a jet of the inclosed water to escape upwardly through the water in the tank, and preferably through a surrounding tube, in such a way that it will carry upwardly with it a stream of the tank water several times its own volume. This combined stream or jet, projected upwardly by the force of the escaping water, is received in an elevated vessel or trough near the top of the apparatus, from which point it flows to the water wheel or other device by which its power is utilized, the water then returning to the tank to be again and continuously used. Thus only the limited amount of water escaping from the pressure pipe through the submerged nozzle is registered by the meter while the weight of three or four times as much is available for power. An escape or overflow pipe carries away the surplus water, representing practically the amount received as a jet from the submerged pipe. Such surplus may be applied to any desired use.

The especial purpose to which we have contemplated applying our invention is the furnishing of an abundant supply of water at a minimum cost to turn steadily the water wheel commonly employed as a mechanical power in the mixing of air and gasolene vapor in lighting apparatus. For convenience and economy in this and similar uses we provide the upper vessel with suitable devices automatic in their action so that the operation may continue without requiring attention, during the hours the machine driven by the composite stream may be in use,—that is, from the time the water is turned on at the wheel until it is shut off.

In the form of apparatus shown in the drawings I provide the elevated water vessel or trough with weighted levers, which are actuated by the weight of water in said vessel, operating to automatically control the admission of water from the main supply.

Figure 2:
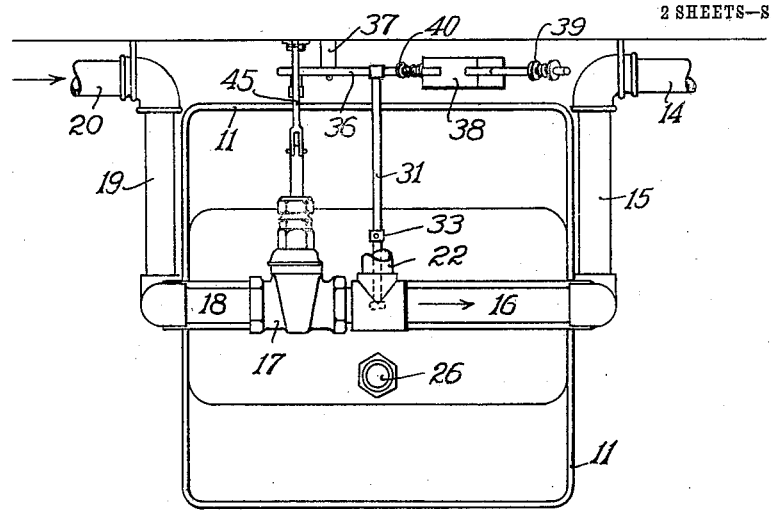
Figure 3:
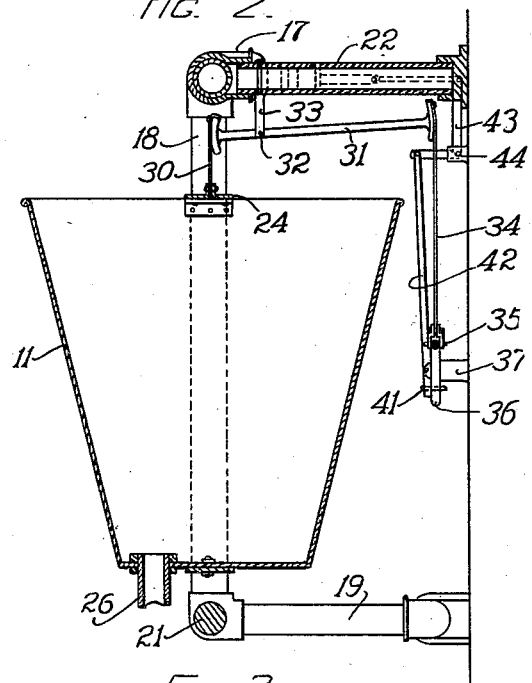
Figure 4:
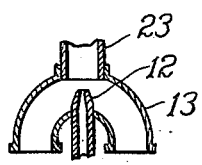

In the drawings: Figure 1 is a general view illustrating our system applied to a gas mixing apparatus. Fig. 2 is a plan view of the elevated water vessel. Fig. 3 is a sectional elevation of the same on line 3—3 of Fig. 1. Fig. 4 is a sectional detail to be explained.

5 is a gas machine provided with an impulse wheel 6, the lower half of which is inclosed in a casing 7.
8 is a drain pipe from casing 7 to a storage tank 9, and 10 is the overflow or outlet from said tank. Within tank 9 we provide means for lifting the water therein to an elevated water vessel 11, the means here shown consisting of a tubular vertical nozzle 12 submerged in tank 9 and introduced into the under side of a tubular T or back outlet return bend 13, Figs. 1 and 4. Nozzle 12 is the terminus of an inlet pipe 14, which is supplied with water under pressure, by pipes 15 and 16, through valve 17 and pipes 18 and 19 from the main supply pipe 20.

Pipes 15 and 19 are shown in Fig. 2. Pipes or rods 21 and 22 act merely as braces to assist in supporting vessel 11 in its elevated position.

23 is the guide tube or water lifting pipe, preferably of glass to reduce friction, curved at top as in Fig. 1 for filling vessel 11, and is shown connected at its lower end to return bend 13, so as to receive the jet of water issuing from nozzle 12 and the stream thereby drawn from the tank, and deliver the composite stream into vessel 11. Said vessel 11 is movably mounted to slide on pipes 16 and 18 Figs. 1 and 2, by means of guides 24 and 25, secured to it; and attached to its under side is the discharge pipe 26, connected by means of the flexible tube 27 to pipe 28 which feeds impulse wheel 6.
Admission of water to wheel 6 is controlled by valve 29.

The weight of vessel 11, as here shown, is at all times supported by a flexible band 30 Fig. 3, preferably of brass or sheet steel, attached at its lower end to guide bar 24 and at its upper end to the short arm of a rock lever 31, pivoted at 32 to a support 33 secured to the fixed tube 22, see Figs. 2 and 3. To the long arm of lever 31 is attached a similar flexible band 34 which is pivotally connected at 35 to a weight arm 36, which is in turn pivoted at 37 to the wall or support which holds the vessel 11. On the outer end of weight arm 36 is a sliding weight 38 which moves between spring stops 39 and 40 secured to arm 36. At the inner end 41 of arm 36 is pivotally connected link 42 by means of which is operated rock-arm 43 pivoted at its angle to the support 44, Fig. 3. The upper end of this rock-arm is pivoted to a valve rod 45, see Fig. 2 and in dotted lines Fig. 3, by which valve 17 is closed when the weight of water received in vessel 11 causes it to descend slightly, actuate levers 31 and 36, and shift the position of the sliding weight 38. This automatic closing of the valve suspends action of the jet, but water continues to be supplied to wheel 6 through pipes 26, 27, 28 and cock 29, until the supply in vessel 11 is so reduced that its weight is no longer sufficient to keep the weight 38 and weight arm 36 in the raised positions indicated in Figs. 1 and 3, whereupon weight arm 36 drops to the opposite oblique position, the weight 38 slides outwardly against spring stop 39, vessel 11 rises slightly and valve 17 opens to automatically start the jet and again fill the tank and repeat the operation indefinitely. When cock 29 is closed all action ceases as soon as the filling and descent of vessel 11 closes valve 17 as above stated.

I claim as my invention:

1. In combination with a hydraulic motor, a tank a discharge between the motor and the tank, a movable vessel a connection between the movable vessel and the motor, and means for conveying fluid from the tank to the vessel, and provision in virtue of which the movement of the vessel controls said conveying means.

2. In combination with a hydraulic motor, a tank, a discharge connection between the motor and the tank, a movable vessel, means for conveying fluid from the tank to the vessel, the weight of the fluid imparting movement to the vessel in one direction and means for moving the vessel in an opposite direction, and provision in virtue of which the movement of the vessel controls the fluid conveying means.

3. In combination with a hydraulic motor, a tank, said motor discharging into the tank a vessel in communication with the motor, an arm pivoted intermediate its length through a suitable support, a flexible connection between one end of the arm and the vessel, a fluid supply pipe, a valve therefor, means connected to the opposite end of the lever for operating said valve, means for elevating fluid from the tank to the vessel, the weight of the fluid imparting movement to the vessel in one direction and means for imparting movement to the vessel in an opposite direction.

4. In combination with a hydraulic motor, a tank said motor discharging into the tank, a vessel, a lever pivoted intermediate its length to a suitable support, a flexible connection between one end of the lever and the tank, a second lever pivoted intermediate its length, a flexible connection between the opposite end of the first named lever and the end of the second lever, a weight carried by the opposite portion of the second named lever, a suitable supply pipe having a valve, connections between the second named lever and the valve for controlling the same and means for elevating fluid from the tank to the vessel.

GEORGE W. PALMER.
FREDERICK E. PIERCE.

Witnesses:
E. R. BROWN,
O. A. TAFT.